Patented Aug. 25, 1925.

1,551,307

UNITED STATES PATENT OFFICE.

CHARLES E. HITE, OF PHILADELPHIA, PENNSYLVANIA.

COMPOSITION OF MATTER.

No Drawing. Application filed August 28, 1923. Serial No. 659,804.

*To all whom it may concern:*

Be it known that I, CHARLES E. HITE, a citizen of the United States, residing at 317 So. 15th Street, Philadelphia, in the county of Philadelphia and the State of Pennsylvania, have invented new and useful Improvements in Composition of Matter, of which the following is a specification.

My invention relates to a new and useful composition of matter and an article of manufacture made therefrom. The object of this invention is to produce what I term "lime sulfur hydrate" of such properties that when combined with water and other ingredients will produce a plastic material which when thoroughly dried will be uniformly dense and hard throughout the mass.

Commercial hydrated lime is now extensively produced and marketed in bags. It may contain hair, plaster of Paris, portland cement, or sand depending upon the use for which the hydrate is intended.

This hydrated lime of commerce when made into a plastic mortar with sand and water, when dried depends for its strength upon the small amount of calcium silicates and the calcium carbonate formed. These chemical reactions have been found to apply and to occur only on the surface and do not penetrate the plaster to any considerable depth, therefore the plaster is easily broken and crumbles readily with slight pressure.

I have found that if a relatively small quantity for example not exceeding twenty-five per cent by weight, of powdered sulfur (preferably flower of sulfur) is intimately mixed with seventy-five per cent of lime that has been slaked or hydrated with sufficient water to form a dry powder, having the formula of $Ca(OH)_2$ it will remain a mechanical mixture without any chemical change taking place between the hydrated lime and the sulfur until the mixture is formed into a plastic mass by the addition of water. If boiling water is used to form the plastic mass chemical action begins at once and sulfids of calcium are rapidly formed, as indicated by a yellow colour appearing uniformly through the mixture. When the mass dries out and after a lapse of sufficient time the sulfids bleach white and become insoluble in water; this sulfided calcium hydrate is then uniformly dense and hard.

When cold water is used to form the plastic mass the chemical reaction is slower, the sulfids bleach as formed and the final result is the same as when the hot water is used.

It is obvious that if the mixture is intended for immediate use the sulfur may be added to the lime while slaking or immediately after and thoroughly mixed therewith.

I may add either to my dry or plastic lime sulphur hydrate-materials well known in the art of wall plastering for example hair, bonding materials for example such as plaster of Paris, portland or hydraulic cement, body filling materials for example such as sand, cinders, diatomaceous earth, sawdust, fibrous materials for example such as wood pulp, excelsior, straw, grasses, bast fibers, asbestos, or other bonding, body filling or fibrous materials depending upon the use to which the dry or the plastic material is to be put. I do not limit myself to the percentum combination of any or all of the named materials, when combined with my lime sulfur hydrate.

My lime sulfur hydrate may be utilized in combination with any suitable material for any and all purposes where hydrated lime, plaster of Paris, portland cement, sand and lime mortars are employed for the production of plastic compositions used in the formation of building blocks, molded architectural designs, scratch, brown and finish wall plaster coats or my lime sulfur hydrate may be bagged and marketed as such, or it may be mixed with other materials, for example such as these named, at the time of slaking, or mixed with other materials in the dry state and sold in bulk or in bags.

I am well aware that the mixture of lime (calcium oxide) and sulfur boiled in an excess of water for the production of soluble lime sulfur solution is old in the arts, (attention is called to page 6 of Farmer's Bulletin, No. 1285, U. S. Dept. of Agriculture) and I lay claim to no such mixture or combination. In the production of lime sulfur solution there is enough sulfur (usually two of sulfur to one of lime) to completely neutralize the lime the resulting material is then completely soluble in water, the higher polysulfids being formed. In the case of my Lime Sulfur Hydrate there is a large excess of hydrated lime; this hydrated lime is bonded together by adding water, producing a plastic mass, and by the formation of the lower sulfids, which becomes insoluble in water, when the mass is dried.

However the lime sulfur solution of commerce may be added to an excess of hydrated lime to accomplish the same result as adding the powdered sulfur; the polysulfids of the lime sulfur solution being converted in to the lower sulfids due to the excess of lime, and my invention anticipates this combination as the final results are identical.

Having thus fully described my invention, what I claim as new and useful is:—

1. A dry powdered composition of matter consisting of a mechanical mixture of not exceeding 25% by weight of sulfur to 75% of hydrated lime, the same adaptable to being formed into a plastic mass with water, when so desired as and for the purposes described.

2. A dry powdered composition of matter consisting of sulfur and hydrated lime intimately mechanically mixed together in such relative proportions, that when formed into a plastic mass with water, the resulting calcium sulfur salts formed while wet, become when dry insoluble in water and serve as a bonding or cementing material for the chemically uncombined excess of lime present in the composition.

In testimony whereof, I have hereunto affixed my signature.

CHARLES E. HITE.